United States Patent [19]

Giglietti

[11] Patent Number: 4,831,766
[45] Date of Patent: May 23, 1989

[54] ANIMAL TRAP

[76] Inventor: Joseph N. Giglietti, 202 N. Center St., Joliet, Ill. 60433

[21] Appl. No.: 119,150

[22] Filed: Nov. 10, 1987

[51] Int. Cl.⁴ ............................................. A01M 23/16
[52] U.S. Cl. ........................................... 43/61; 43/60; 43/66
[58] Field of Search .................. 43/60, 61, 58, 66, 67, 43/131

[56] References Cited

U.S. PATENT DOCUMENTS

| | | | |
|---|---|---|---|
| 1,488,503 | 4/1924 | Karda | 43/66 |
| 2,216,644 | 10/1940 | Heldman . | |
| 2,454,476 | 11/1948 | Price | 43/60 |
| 3,688,432 | 9/1972 | Fruits . | |
| 3,729,852 | 5/1973 | Holmes . | |
| 3,733,735 | 5/1973 | Hirsch . | |
| 3,975,857 | 8/1976 | Branson | 43/61 |
| 4,318,241 | 3/1982 | Fassauer . | |
| 4,413,439 | 11/1983 | Lindley | 43/61 |
| 4,468,883 | 9/1984 | Williams | 43/61 |
| 4,557,066 | 12/1985 | Godwin, Jr. . | |
| 4,578,892 | 4/1986 | Melton . | |
| 4,660,320 | 4/1987 | Baker | 43/131 |
| 4,709,504 | 12/1987 | Andric | 43/114 |

FOREIGN PATENT DOCUMENTS 2583617 12/1986 France ...................................... 43/60

Primary Examiner—Kurt Rowan
Attorney, Agent, or Firm—Thomas W. Speckman; Douglas H. Pauley

[57] ABSTRACT

An animal trap in the form of a closed container having side walls, a bottom wall, and a top wall wherein the side wall has a door opening and a mating inwardly opening door hingedly mounted to the side wall with a bias spring urging the door to a normally closed position providing a closed trap. The door has inwardly flaring bevel edges to provide for a tight closure and prevention of the animal inhabiting the trap from opening the door. The top wall has at least a generally transparent portion to ascertain whether or not the trap is inhabited. The trap has an inner partition forming a pathway greater than the overall length of the animal to be trapped from the door opening to a bait position to induce the animal to fully enter the trap, allowing tight closure of the door. The trap of this invention provides an inexpensive, completely disposable, sanitary animal trap which may be adapted for a wide variety of sizes of animals.

7 Claims, 1 Drawing Sheet

U.S. Patent    May 23, 1989    4,831,766

ANIMAL TRAP

BACKGROUND OF THE INVENTION

1. Field of the Invention

This invention relates to an animal trap, such as a mouse or rat trap, which is sanitarily disposable without touching the bait or captured rodent and is not susceptible to tripping by or injury to children, cats, dogs and the like. The normally closed animal trap of this invention has a hinged inwardly opening door which has inwardly flaring beveled mating edges with the adjacent walls and has a bias spring urging the door to the normally closed position. The animal trap of this invention has a generally transparent top wall portion to ascertain whether or not the trap is occupied for disposal.

2. Description of the Prior Art

Widely used mouse and rat traps having dangerously exposed spring action mechanisms are well known. Disadvantages of these traps include their danger to children, cats and dogs, as well as their unsightly, unsanitary, and generally unpleasant appearance, especially when occupied. Various attempts have been made to provide enclosed animal traps which overcome the above disadvantages and, in some cases, to provide a closed container for sanitary disposal.

An animal trap having an inwardly hinged normally open door is illustrated by U.S. Pat. No. 3,733,735 wherein a trigger holding the door open is separated by the animal's consumption of bait providing closure of the door. The animal traps disclosed by this patent are taught to be cylindrical tin cans, through which one does not have visibility, or bottles, which are breakable, and require legs to prevent rolling. U.S. Pat. No. 3,729,852 teaches a cap for a tin can, the cap having a normally open door which pivots in a vertical plane about an extending pivot point, action of which is triggered by action of the animal on a bait holder inside the can. The door must be latched open each time and legs on the cap assembly prevent rolling of the tin can. U.S. Pat. No. 2,216,644 teaches a guillotine gravity operated door which is normally open in the cap of a disposable glass jar. The vertically sliding door is released by an animal entering the trap and disengaging a latch. U.S. Pat. No. 4,557,066 discloses a cylindrical container having a spring loaded conical door which is normally open, the animal triggering closure by disengaging the conical door from a retainer. The trap lies on its side tending to roll and has the disadvantage that setting it may be finger-pincher. Also, if too large an animal attempts to enter the trap, it may become impaled between the released door and its frame. U.S. Pat. No. 3,688,432 teaches a trap, specifically designed for the habits of brown rats, having a horizontal opening with a door held normally open by a trigger mechanism which is tripped by an entering animal to close the door. The top is preferably a steel mesh so that one may see through the cover to determine occupancy of the trap. U.S. Pat. No. 4,578,892 teaches a rodent trap having a hinged normally open door, the trap having a bottom of two contiguous bottom surfaces forming an obtuse angle whereby the animal enters the trap, causes the trap to tip and the door to close with the animal inside due to a shift of the center of gravity of the occupied trap. The door must be latched shut to prevent escape of the animal from the trap. U.S. Pat. No. 4,318,241 teaches an animal extermination trap which does not have a door but has an opening through which an animal enters, causing the trap to tilt, mixing two chemical components which forms foam surrounding, killing and encapsulating the animal. Movement of this trap by a dog or any other animal not entering it may also cause foam formation and render the trap worthless.

SUMMARY OF THE INVENTION

It is an object of this invention to provide a safe, sanitary, disposable animal trap.

It is a further object of this invention to provide an animal trap having a normally closed inwardly opening door in a side wall for entry of the animal to be trapped allowing closing of the door after entry of the animal.

It is a further object of this invention to provide a closed container animal trap having a close fitting door in closed position so that insufficient air is provided for extended animal life within the trap.

It is yet another object of this invention to provide an animal trap which may be secured to a floor or baseboard to prevent moving of the trap.

It is still another object of this invention to provide a trap having at least a generally transparent portion of a top wall so that occupancy of the trap may be readily ascertained without touching the trap.

It is yet another object of this invention to provide an animal trap in which complete disposal of the trap, bait and animal in a closed container is achieved so that one does not touch any of the animal or bait in disposal of the trap and does not have to remove the animal from the trap for disposal.

It is an object of this invention to provide a simple animal trap design which may be economically manufactured for complete disposal after a single use.

The above objects and other advantages compared to prior art animal traps are provided by an animal trap comprising a closed container having side walls, a bottom wall, and a top wall, the side wall having a door opening and a mating inwardly opening door hingedly mounted to the side wall with a bias spring urging the door to a normally closed position, the door having inwardly flaring bevel edges mating with the door opening, the top wall having at least a generally transparent portion, and an inner partition forming a pathway greater than the overall length of the animal to be trapped from the door opening to a bait position. In one embodiment, adhesive means are secured to the outer surface of a side wall and/or a bottom wall in at least one location to provide for adhesive securance of the trap to a stable position by adhering to the floor or a side wall, such as a baseboard. Animal traps according to this invention may be appropriately sized for mice, rats, or other desired animals.

BRIEF DESCRIPTION OF THE DRAWING

The above objects and advantages of this invention are best understood by reading of the further detailed explanation, together with the drawings wherein.

DESCRIPTION OF THE PREFERRED EMBODIMENTS

Figure 1:
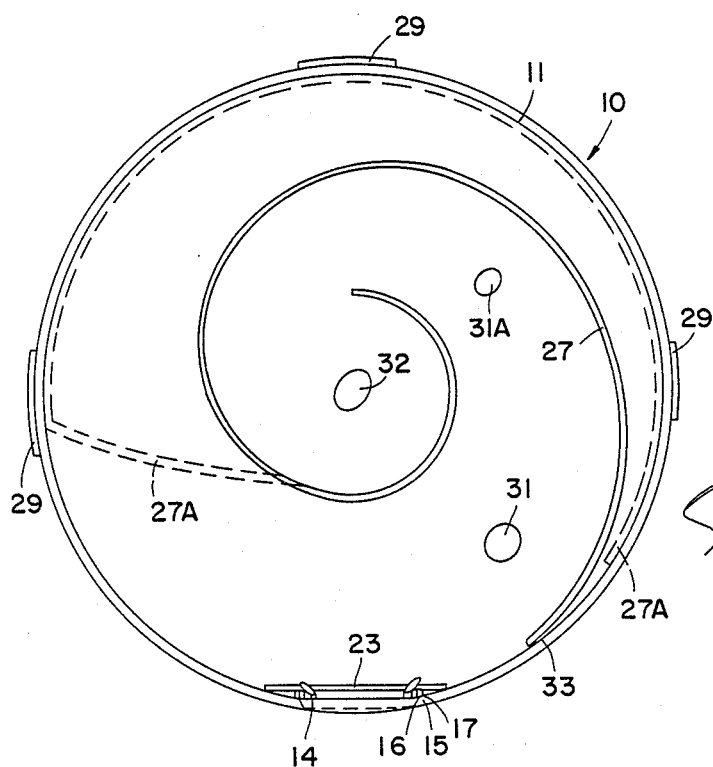
FIG. 1 is a plan view of an animal trap according to one embodiment of this invention and having the top wall removed.
Figure 2:
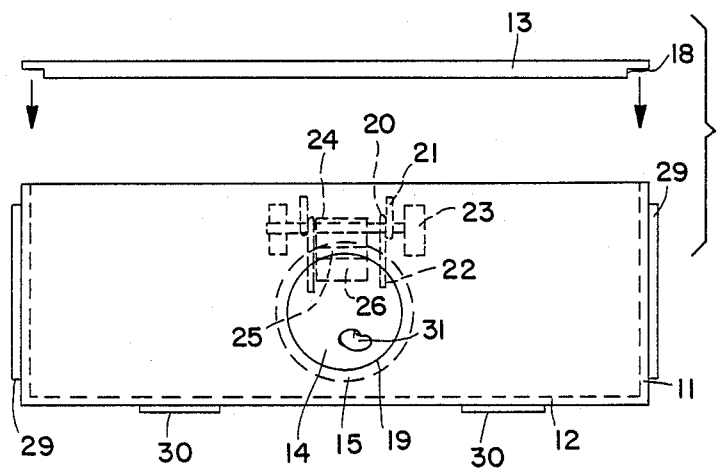
FIG. 2 is a side view of the animal trap shown in FIG. 1.

FIGS. 1 and 2 show a cylindrical animal trap according to this invention generally designated as 10. Side wall 11, bottom wall 12, and top wall 13 form a closed container when door 14 is in its normally closed position. Side wall 11 is provided with inwardly opening door 14, door 14 having inwardly flaring bevel 15 forming outer door edge 16 and inner door edge 17. Bevel 15 suitably forms an angle of about 30° to about 60° with the adjacent surfaces of the side walls and preferably about 45°. Door 14 fits snugly within door opening 19 by bevel 15 and the inner surface of door 14 conforms closely to the adjacent surfaces of side walls 11, when door 14 is in closed position, to prevent an animal occupant of the trap from opening the door by being able to have access to an edge for the animals teeth or paws. Door 14, when closed, fits tightly so that the occupying animal uses up the enclosed air and rapidly suffocates. The tightly fitting door in the normally closed trap makes it safe to leave the trap in an unoccupied house without the danger of odor.

Door 14 is hingedly mounted to side wall 11 providing inwardly opening of the door by any suitable hinge mean known to the art. It is preferred that the hinge be mounted at a top or side position of the door to provide for upwardly or sidewise rotation of the door about the hinge. As shown in FIGS. 1 and 2, hinge wall side 24 is mounted to side wall 11 and hinge door side 26 is mounted to door 14 with hinge pin 25 being in a location to provide snug closing of the door within sidewall door opening 19. Door 14 is urged to a normally closed position by any suitable bias spring means known to the art. As shown in FIGS. 1 and 2, spring 20 surrounds retaining rod 23 having end 21 extending against side wall 11 and opposite end 22 extending against door 14 to urge door 14 into the normally closed position. A pair of such bias springs may be mounted on a single retaining rod, as shown in FIGS. 1 and 2. A number of spring biased hinges are known to the art which incorporate a bias spring into the hinge assembly and provide urging of the hinge to a position which, when mounted on door 14, would urge the door to the normally closed position and are suitable for use in this invention. The force of the bias spring means against door 14 is sufficiently small so as to allow inwardly opening of door 14 by the animal pushing against it to permit entry of the animal sought to be trapped into the interior of the trap while being sufficiently great a force so as to maintain door 14 in its normally closed position. The bias force requirements for various animals and various sized traps may be readily ascertained. Lure 31 may be attached to the exterior of door 14 to attract the rodent to the door. This lure, being on the exterior, may be protected by a peel strip which may be removed upon placement of the trap, thereby providing a very fresh lure.

FIG. 1 shows inner partition 27 in a generally spiral form and located such that the lure may be placed in multiple locations shown as 31 and 31A to induce the animal to enter the trap sufficiently far so that its overall length, including its entire body and tail, will be within the interior of the trap allowing door 14 to close snugly. Bait 32 may be placed at the center of the spiral to both attract the animal and to hasten the trapped animal's demise. Any lure or bait known to the art may be used. Inner partition 27 may be inserted and fastened to the side wall, bottom wall and/or top wall by any means known to the art, such as spot weld 33. In another embodiment, the inner partition may be of the shape shown in FIG. 1 as 27A wherein inner partition 27A, being generally spiral in form, will automatically retain its position within the trap by a spring force against side walls 11. Other similar arrangements of inner partitions may be used, the important feature being that the inner partition forms a pathway from the door to the bait greater than the overall length of the animal, including any tail, allowing snug closure of door 14 while the trap is occupied.

As shown in FIG. 2, top wall 13, according to one embodiment of this invention may be removable and firmly held in place by snug fitting top notches 18. It is preferred that top wall 13 be affixed to side wall 11 to provide a closed trap Which, upon dropping or kicking, remains tightly closed, especially when occupied. It is preferred that top wall 13 have a generally transparent portion of sufficient size to ascertain visually whether the trap is occupied. At least a portion of top wall 13 is generally transparent, and the entire top wall may be a transparent material, such as lucite or any other transparent plastic sheet material.

It is an advantage of this invention, in the embodiment shown in FIGS. 1 and 2 employing a cylindrical container, that the bottom 12 is generally flat so that the animal trap may be set on a floor or other flat surface and not tend to roll and does not require additional structure such as feet. To further secure the animal trap to the floor, bottom securement means 30 may be applied to the exterior of bottom wall 12 and side securement means 29 may be provided in various locations on the exterior surface of side wall 11. These securement means may be any suitable adhesive means known to the art such as double sided adhesive sheets cut into desired sizes and preferably having a strippable protective layer on the outer surface. In this manner, the protective layer may be easily removed from the bottom and side securement means at desired locations and the trap may be readily secured to both the floor and a baseboard or side wall where rodents such as rats and mice frequently have paths. Stabilizing the trap to a single location also reduces the likelihood of its being tampered with by children or moved by pets or other animals.

Figure 5:
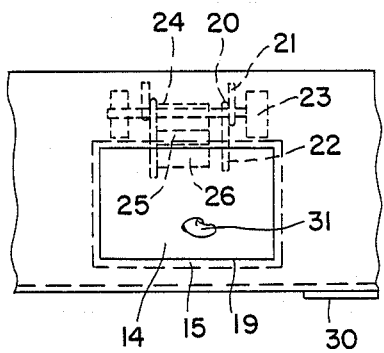
FIG. 5 is a side view of the animal trap shown in FIG. 1 but having a rectangular door in lieu of a round door as shown in FIG. 2.

In other embodiments, the animal trap of this invention may be any polygonal or closed curved shape, such as square, rectangular as shown in FIG. 5, oval, and other specific closed shapes. The animal trap preferably has a flat bottom wall for stabilizing on flat surfaces, such as floors. Door 44 is shown as round, but may be rectangular or any other suitable shape.

The animal trap of this invention is preferably constructed of metal or plastic material which may be very inexpensively fabricated into the desired shapes, with the only restriction on materials being that at least portion of top wall is generally transparent to allow visual observation of whether or not the trap is occupied. Likewise, the side walls and bottom wall may be fabricated from metal and the top wall from a transparent plastic. It is preferred that the side walls be opaque to visual observation of the inside of the trap by the animal desired to be trapped. Any suitable material of construction which is durable and suitable for containment of the trapped animal is suitable for use in the animal trap of this invention.

Any suitable lure and bait known to the art may be used in the trap of this invention. Suggested lure and bait locations have been pointed out above, but are not to be considered restrictive, the only requirement being that the lure and bait be so situated within the trap so as to induce the animal to wholly enter the trap permitting firm closure of the normally closed door. A lure material may also be placed on the edge of the door or on the inner wall adjacent the door to induce the animal to enter the trap. It is also within the scope of this invention to additionally provide a bait containing poison within the trap to disable the animal once it has entered and the door has closed. It is desired that the door be close fitting and allow very little or no outside air entry into the trap so that an animal inhabiting the trap will quickly suffocate.

Figure 3:
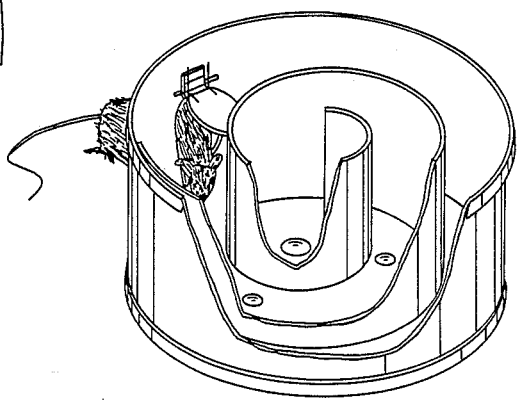
FIG. 3 is a cutaway perspective view showing an animal entering a trap of this invention.
Figure 4:
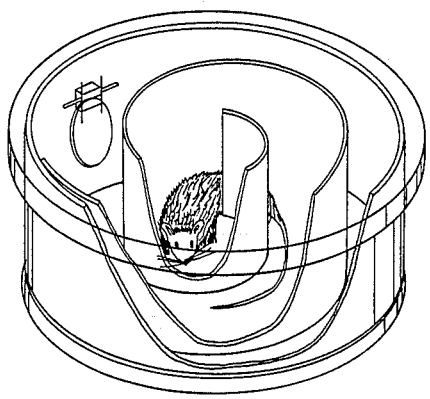
FIG. 4 is the same view of the trap of FIG. 3 showing the animal closed within the trap.

FIG. 3 shows a trap similar to that shown in FIGS. 1 and 2 with a rodent entering the normally closed door. FIG. 4 shows the trap of FIG. 3 with the rodent advanced to the bait and wholly within the trap with the door closed.

It should be readily apparent that the size of the trap according to this invention may be readily adjusted for the animal desired to be trapped. When a round door is utilized, the circumference should be greater than the girth of the animal to be trapped, while when a rectangular door is used, the height and width are generally greater than those of the animal to be trapped. Likewise, the inner partition must form a pathway greater than the overall length of the animal to be trapped from the door opening to the bait position to allow closing of the normally closed door. For mice, I have found that a cylindrical trap of about 2 ½ inches in outer diameter, about 1 ½ inch high with a door of about ¾ inch in diameter with a transparent plastic top side and opaque side walls and bottom wall is suitable.

It can be seen from the above description that I have provided a very inexpensive, completely disposable, unbreakable animal trap which overcomes the disadvantages of the animal traps set forth in the prior art described above.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A preset animal trap comprising a cylindrical closed container having a side wall, a bottom wall, and a top wall, said side wall having a door opening and a mating inwardly and upwardly opening door hingedly mounted to said side wall, a bias spring urging said door to a preset normally closed position, said door opening and said door having inwardly flaring peripheral bevel mating edges, said top wall having at least a generally transparent portion, and a spiral-shaped inner partition having its outermost end abutting said side wall forming a non-continuous loop pathway, said spiral-shaped inner partition forming a spiral animal pathway from said door opening for a distance greater than an overall length of the animal to be trapped, thereby allowing said bias spring to urge said door to said normally closed position after the animal has entered the animal trap.

2. An animal trap according to claim 1 wherein said door is generally round having a circumference greater than the girth of the animal to be trapped.

3. An animal trap according to claim 1 wherein said peripheral bevel forms an angle of about 30° to about 60° with the adjacent surface of said side wall.

4. An animal trap according to claim 1 wherein said peripheral bevel forms an angle of about 45° with the adjacent surface of said side wall.

5. An animal trap according to claim 1 wherein adhesive means are secured to the outer surface of said side walls in at least one location.

6. An animal trap according to claim 1 wherein adhesive means are secured to the outer surface of said bottom wall in at least one location.

7. An animal trap according to claim 1 wherein said door is generally rectangular having a height and width generally greater than those of the animal to be trapped.

* * * * *